(12) United States Patent
Harkin

(10) Patent No.: US 6,583,398 B2
(45) Date of Patent: Jun. 24, 2003

(54) IMAGE SENSOR

(75) Inventor: Gerard F. Harkin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 214 days.

(21) Appl. No.: 09/736,663

(22) Filed: Dec. 12, 2000

(65) Prior Publication Data

US 2001/0019080 A1 Sep. 6, 2001

(30) Foreign Application Priority Data

Dec. 14, 1999 (GB) .............................. 9929501

(51) Int. Cl.$^7$ .............................................. H01L 27/00
(52) U.S. Cl. ................. 250/208.1; 250/214 R
(58) Field of Search ................ 250/208.1, 208.4, 250/214 L, 208.2, 214 R; 257/223, 222, 229, 234, 292, 291

(56) References Cited

U.S. PATENT DOCUMENTS 6,002,123 A * 12/1999 Suzuki ..................... 250/208.1
6,005,238 A * 12/1999 Mei et al. ................. 250/208.1
6,040,568 A * 3/2000 Caulfield et al. ......... 250/208.1
6,104,020 A * 8/2000 Knee et al. ............... 250/208.1

FOREIGN PATENT DOCUMENTS

EP    0773669 A2    5/1997    ........... H04N/3/15
EP    0825763 A2    2/1998    ........... H04N/3/15

* cited by examiner

Primary Examiner—Robert H. Kim
Assistant Examiner—Hoon K. Song
(74) Attorney, Agent, or Firm—John Vodopia

(57) ABSTRACT

An image sensor (39) comprises a plurality of pixels (10), each pixel comprising a light sensor element (12), wherein a sensor voltage across the element varying depending on the light incident on the element. First and second transistors (14,16) are connected in series between voltage supply lines (18,20). A gate voltage (Vg1) on the first transistor is dependent upon the sensor voltage so that the current flowing through the first transistor (14) is a function of the sensor voltage. The gate voltage (Vg2) of the second transistor is supplied by a feedback circuit (22,24,26) which provides that the current through the first and second transistors (14,16) is substantially equal. The output of the pixel (10) is the gate voltage (Vg2) of the second transistor (16). The image sensor design of the invention avoids the need for storage capacitors to provide pixel gain.

11 Claims, 4 Drawing Sheets

IMAGE SENSOR

BACKGROUND OF THE INVENTION

1. Field of the Invention

This invention relates to image sensors, in particular having arrays of image sensing pixels, for example for use as solid state x-ray imaging devices.

2. Description of Related Art

There is significant interest in developing solid state x-ray imaging devices, to replace the image intensifiers currently used in hospitals.

Various pixel configurations have been proposed in which each pixel comprises a light sensitive element, such as a photodiode, and at least one switching device. For example, one known pixel design comprises a single thin film transistor (TFT) and a photodiode. During an exposure period, the TFT is turned off so that the photodiode is isolated. Incident light causes a minority carrier current to be produced, which causes the self parasitic capacitance of the diode to be discharged. During the next readout, the capacitance of the diode is reset and the change in charge is detected by the amplifier.

It has also been proposed to include an additional storage capacitor within the pixel configuration, in order to provide gain. The storage capacitor charge can then be detected by the readout amplifier.

One problem with this approach is the area required for the storage capacitor which can limit the possible resolution which can be achieved. There is, however, a need to provide pixel gain, as this improves the signal to noise ratio of the image sensor pixel.

SUMMARY OF THE INVENTION

According to the invention, there is provided an image sensor comprising a plurality of pixels, each pixel comprising:

a light sensor element, a sensor voltage across the element varying depending on the light incident on the element; and first and second transistors, the first and second transistors being connected in series between voltage supply lines, a gate voltage on the first transistor being dependent upon the sensor voltage so that the current flowing through the first transistor is a function of the sensor voltage, and wherein the gate voltage of the second transistor is supplied by a feedback circuit which provides that the current through the first and second transistors is substantially equal, and wherein the output of the pixel is the gate voltage of the second transistor.

The image sensor design of the invention avoids the need for storage capacitors, because the voltage across the light sensor element is measured, rather than the flow of charge through the light sensor element during a recharging process.

Preferably, the first and second transistors have different current versus gate voltage characteristics, so that the pixel provides gain. Again this is achieved without the need for storage capacitors which can occupy a large area of the image sensor substrate.

Preferably, the feedback circuit includes an open loop amplifier, so that a minimum current is drawn, which enables the current through the first and second transistors to be kept substantially equal. The input to the amplifier may be the junction between the transistors, and the output from the amplifier is then coupled to the gate of the second transistor.

The image sensor preferably comprises rows and columns of pixels, with one amplifier provided for each column.

The light sensor element preferably comprises a photodiode, which may be coupled between one of the voltage supply lines and the gate of the first transistor. To provide an initial reset function, a switch may be provided which enables a predetermined voltage to be applied to the gate of the first transistor, thereby charging the photodiode to a predetermined level.

The invention also provides a method of measuring light intensity of an image to be detected using a plurality of light sensor elements each forming a pixel of an image sensor, a sensor voltage across the elements varying depending on the light incident on the elements, the method comprising:

applying the sensor voltage to a gate of an associated first transistor thereby causing the current flowing through the first transistor to be a function of the light sensor voltage;

supplying a gate voltage to an associated second transistor using a feedback circuit which provides that the current through the first and second transistors is substantially equal; and measuring the gate voltage of the second transistor as output.

BRIEF DESCRIPTION OF THE DRAWINGS

Examples of the present invention will now be described by way of example, with reference to and as shown in the accompanying drawings in which.

DETAILED DESCRIPTION OF THE PREFERRED EMBODIMENT

Figure 1:
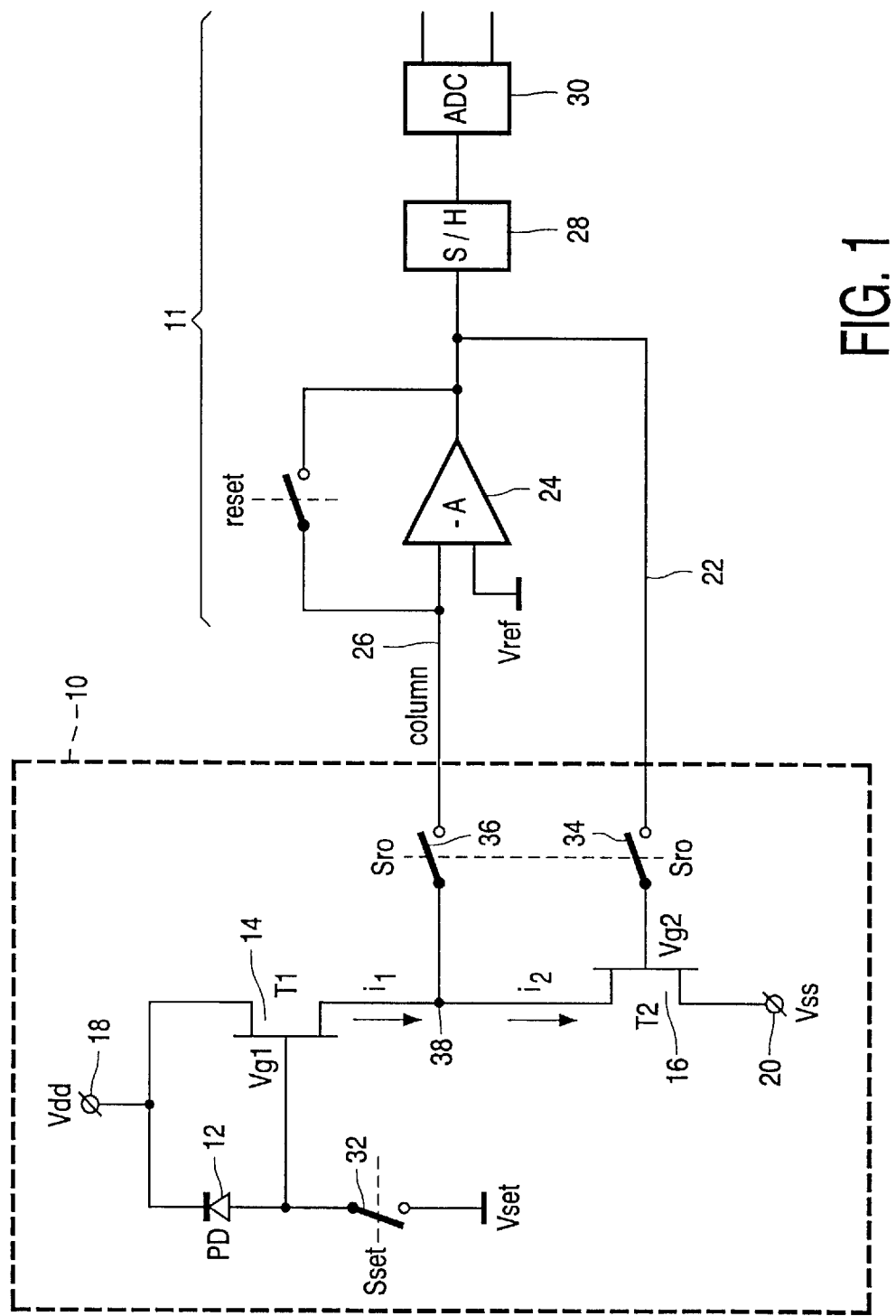
FIG. 1 shows a first example of pixel configuration for use in an image sensor according to the invention.

FIG. 1 shows one possible pixel configuration according to the invention for forming a solid-state image sensor. Area 10 represents the components of an individual pixel, whereas the components generally indicated at 11 may be shared between a number of pixels 10, as will be apparent from the description below.

Each pixel 10 comprises a light sensor element 12, in the form of a photodiode. A voltage across the photodiode varies depending upon the light incident on the photodiode, because a minority carrier current is generated which discharges the self-capacitance of the photodiode during illumination. The pixel comprises first and second NMOS transistors 14, 16 which are connected in series between first and second voltage supply lines 18, 20. The photodiode 12 is connected between the first voltage supply line 18 and the gate of the first transistor 14. As an alternative, the cathode of the photodiode 12 may be connected to an independent power supply line rather than line 18, so that the transistor 14 and the photodiode 12 could be biased independently.

The gate voltage Vg1 on the first transistor is dependent upon the photodiode voltage so that the current 11 flowing through the first transistor 14 is a function of the photodiode voltage. The gate voltage Vg2 of the second transistor is supplied by a feedback circuit 22, 24, 26 which ensures that the current through the first and second transistors is substantially equal. The output of the pixel is the gate voltage Vg2 of the second transistor 16.

This pixel configuration provides an output voltage which is derived from the voltage across the photodiode 12, rather than derived from measurement of charge. The output voltage is sampled by a sample and hold circuit 28, and is converted by an analogue to digital converter 30.

The two transistors 14,16 are preferably lithographically defined side-by-side, and the voltages on the supply lines 18, 20 as well as the voltage Vset (described below) applied to the gate of the first transistor 14, are such that the transistors are operated in the saturation region.

Before the image sensor is exposed to the image to be detected, the anode of the photodiode 12 is set to a fixed voltage level Vset by means of a select switch 32. This results in the gate Vg1 of the first transistor 14 being set to the voltage Vset. To implement the feedback control using feedback loop 22, 24, 26 two output switches 34, 36 are closed. The three switches 32,34,36 are each implemented as further transistors. The pixel is connected to a readout amplifier 24 which is operated in an open loop configuration as a result of the feedback control. The second transistor 16 forms part of the negative feedback loop, with the result that the gate voltage Vg2 of the second transistor 16 will be set at such a voltage that the current $I_1$ through the first transistor 14 equals the current $I_2$ through the second transistor 16. To ensure that the amplifier 24 draws a minimum current at its input 26, it has a high open loop gain. Furthermore, the virtual earth Vref of the amplifier 24 is set to be close to the steady state potential at the junction 38 between the two transistors 14,16.

The drain-source current in the first transistor 14, assuming it is a MOSFET operating in the saturation region, is given by:

$$I_1 = \beta 1 (Vgs1_d - V_T)^2$$

The symbol "d" denotes the gate-source voltage at the end of the reset (dark) phase, and Vgs indicates a gate-source voltage. The dark phase ensures that the currents flowing within the pixel have reached an equilibrium before the light measurement takes place, and that the voltage on the gate of the second transistor 16 at the start of the light measurement operation is known.

The drain-source current in the second transistor 16 is given by:

$$I_2 = \beta 2 (Vgs2_d - V_T)^2$$

When the feedback loop has settled, before the end of the dark phase, both currents will be equal, and the gate-source voltage Vgs that is applied to the second transistor 16 in equilibrium can be expressed by:

$$Vgs2_d = \sqrt{\frac{\beta 1}{\beta 2}} \times (Vgs1_d - V_T) + V_T$$

This gate-source voltage $Vgs2_d$ is sampled by measuring the gate voltage Vg2 at the output of the pixel, and the output switches 34, 36 are then opened.

The image sensor is then exposed to the image to be detected. The gate voltage of the first transistor 14 will increase as the photodiode capacitance discharges, thereby reducing the voltage across the photodiode 12. Eventually, the gate voltage of the first transistor 14 will reach a level $Vgs1_b$ at the end of the bright exposure field. Once again, the two output switches 34, 36 close and the amplifier 24 increases the gate voltage Vg2 of the second transistor 16 until the currents $I_1$ and $I_2$ are equal. The new gate-source voltage Vgs of the second transistor 16 can then be expressed as:

$$Vgs2_b = \sqrt{\frac{\beta 1}{\beta 2}} \times (Vgs1_b - V_T) + V_T$$

This gate voltage is then sampled and the read out switches Sro 34,36 are opened. A small capacitance may need to be fabricated between the gate and source of the second transistor 16 so that the gate voltage will remain constant over during the measurement period. (i.e. a frame period).

The change that occurred in the gate-source voltage Vgs2 of the second transistor 16 during the readout phase can be expressed as:

$$\underbrace{Vgs2_b - Vgs2_d}_{\text{measured by amplifier}} = \underbrace{\sqrt{\frac{\beta 1}{\beta 2}}}_{GAIN} \times \underbrace{(Vgs1_b - Vgs1_d)}_{\text{change in photodiode voltage}}$$

The voltage at the source of both transistors 14,16 will be constant so that the above expression can be rewritten as:

$$(Vg2_b - Vg2_d) = \underbrace{\sqrt{\frac{\beta 1}{\beta 2}}}_{GAIN} \times (Vg1_b - Vg1_d)$$

Since the change in the gate voltage ($Vg1_b - Vg1_d$) of the first transistor 14 corresponds to the change in photodiode voltage Vpd, the expression below shows the relationship between the photodiode voltage and the voltage on the gate of the second transistor:

$$(\Delta Vg2) = \underbrace{\sqrt{\frac{\beta 1}{\beta 2}}}_{GAIN} \times (\Delta Vpd)$$

From the above equation, the change in the gate voltage Vg2 of the second transistor 16 between bright and dark exposures is a multiple of the change in pixel photodiode voltage. The relative dimensions of the two transistors 14,16 determine the gain factor. For example, if the first transistor 14 is four times larger than the second transistor 16, then the pixel circuit will provide a gain of 2. The reference voltage Vref (at the junction 38 between the two transistors 14,16) will no longer be at the mid point between the voltages Vdd and Vss on the supply lines 16,18, but the virtual earth Vref of the amplifier 24 is still set to be close to the steady state potential at the junction 38.

If the above voltage expression is then multiplied by a factor "Cpd" which corresponds to the photodiode capacitance then, the result will be an indication of the signal charge since:

$$Qpix = C_{pd} \times \Delta Vg2$$

The signal charge gives a direct indication of the amount of light incident on the pixel during the previous illumination period. This calculation assumes that the pixel photodiode capacitances will be constant across the sensor plate. In practice, the photodiode capacitance is determined by area and material thickness and its value will be accurate to within a few percent across the sensor plate.

After the bright exposure field, the gate voltage of T1 is reset to the Vset voltage before the next dark exposure.

To perform the calculation of ΔVg2, the two samples of the gate voltage Vg2 can be stored in memory where the subtraction could also be done.

Figure 2:
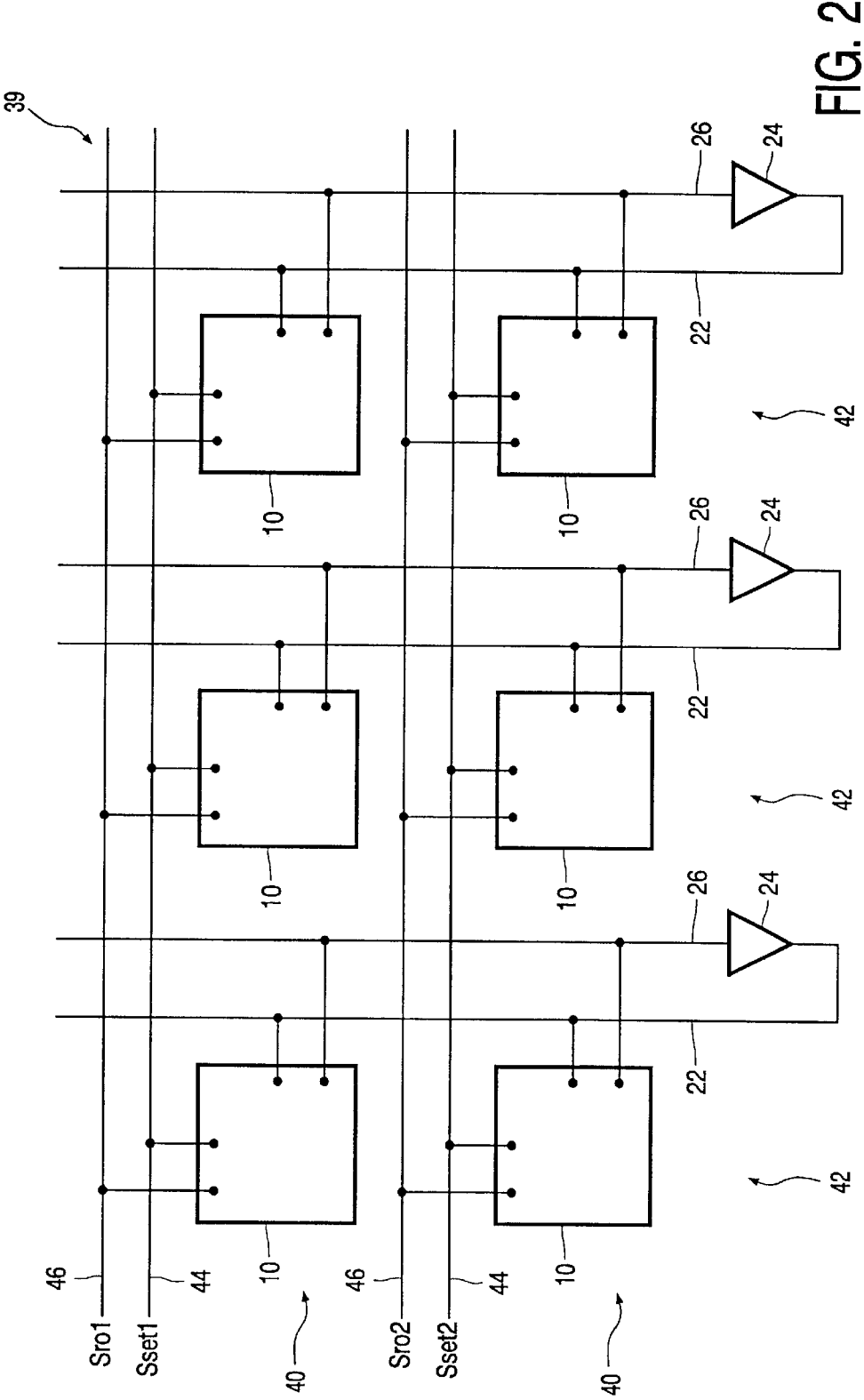
FIG. 2 shows an array of pixels of FIG. 1 connected to form an image sensor.

As shown in FIG. 2, the sensor plate 39 comprises an array of the pixels 10 arranged in rows 40 and columns 42. Each row of pixels 40 shares a common control line 44 for the switches 32 shown in FIG. 1 and a common control line 46 for the read out switches 34,36. Thus, the reset operation (the dark phase) is carried out simultaneously for a row of pixels, and the read out operation (the bright field period) is also carried out simultaneously for all pixels in a row 40.

A single read out amplifier 24 is provided for each column of pixels 42 so that the read out operation can be performed for all pixels in a row at the same time, row by row. Each column of pixels 42 requires two common lines comprising the input 26 to the amplifier 24 and the output 22 from the amplifier 24. The voltage supply lines 18, 20 are shared between all pixels.

Although only six pixels are shown in FIG. 2, there may in practice be many hundreds of rows and columns defining a high resolution image detector. The substrate may cover an area of approximately 20 cm by 20 cm.

To account for variations in the photodiode capacitance, it may be desirable to calibrate each sensor. This is because the individual photodiode capacitance will determine the relationship between the voltage change across the photodiode (which is measured by the circuit) and the light intensity incident on the photodiode during the previous bright field period.

This may be achieved by including photodiode capacitance test structures on the sensor periphery so that the variations in the capacitance parameter Cpd can be determined directly from the glass plate. Alternatively, if the array is exposed to a uniform exposure field as a test procedure, then the output voltages from the readout amplifiers will give an indication of the capacitance variation across the plate. Using this data, processing can be used to compensate for capacitance variations across the plate.

Figure 3:
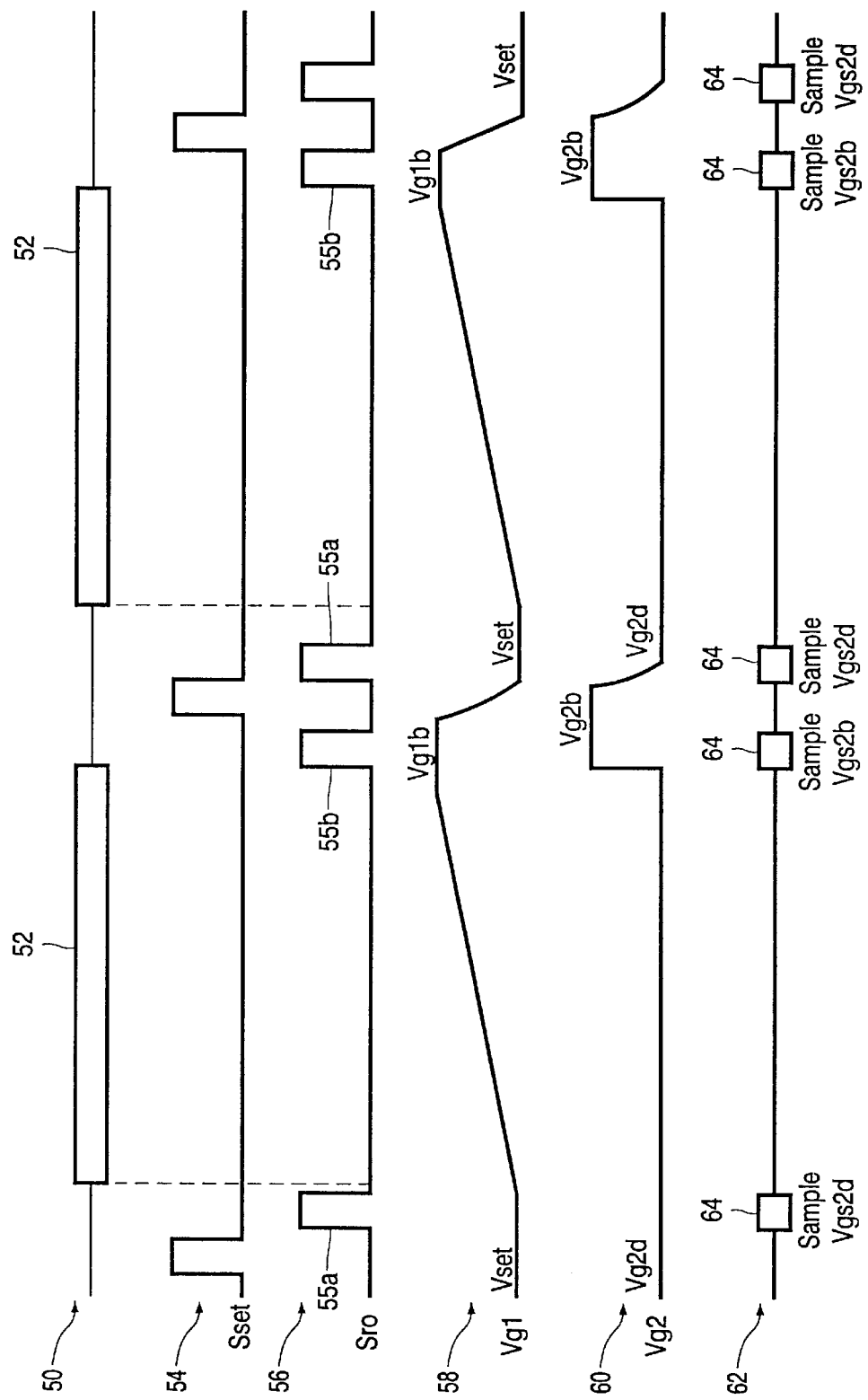
FIG. 3 is a diagram to explain the pixel read out operation.

FIG. 3 gives timing diagrams for explaining further the read out process of the pixel configuration of the invention.

As described above, the start of the read out process involves resetting the photodiode voltage to the level Vset during a so-called dark period. This is achieved with the pulses in the switch control line 44, shown as plot 54. Each pulse in the switch control line 44 (Sset) is followed by closing of the read out switches 34 36 by providing pulses 55a on the switch control line 46 (Sro), shown as plot 56. These pulses close the feedback loop 22,24,26 and cause the transistor arrangement to reach equilibrium. At the end of this period, an output is obtained. This is carried out for all of the rows in turn. Thus, the switch control lines 44,46 for each row will be pulsed in turn during the dark period. FIG. 3 only shows the switch control line pulses for one row between the bright filed periods 52, and is accordingly very schematic.

The bright field period 52 follows the resetting of all photodiodes. During this period, the photodiode is isolated, as the switch 32 is open and the first transistor is turned off. The change in the photodiode voltage is translated onto the gate of the second transistor during a read out pulse 55b.

Plot 58 shows the change in photodiode voltage which results in the voltage change on the gate of the first transistor 14. Plot 60 shows how that change is translated onto the gate of the second transistor.

The sample and hold circuit 28 is controlled to take voltage samples at the end of the dark and bright periods, coinciding with the pulses 55a, 55b on the switch control line 46. Plot 62 shows the sample and hold instants 64.

By way of example, the pixel pitch may be 200 μm. A detector size of 20 cm by 20 cm gives rise to 1000 rows. Working to a frame rate of 30 frames/sec gives an available frame time of 33 ms. It may take 20 μs to take the two read outs for each row (two read out pulses 55a and 55b, and the reset pulse). For this to be carried out for all 1000 rows requires a dark period of 20 ms, leaving 13 ms available for the bright exposure period.

Figure 4:
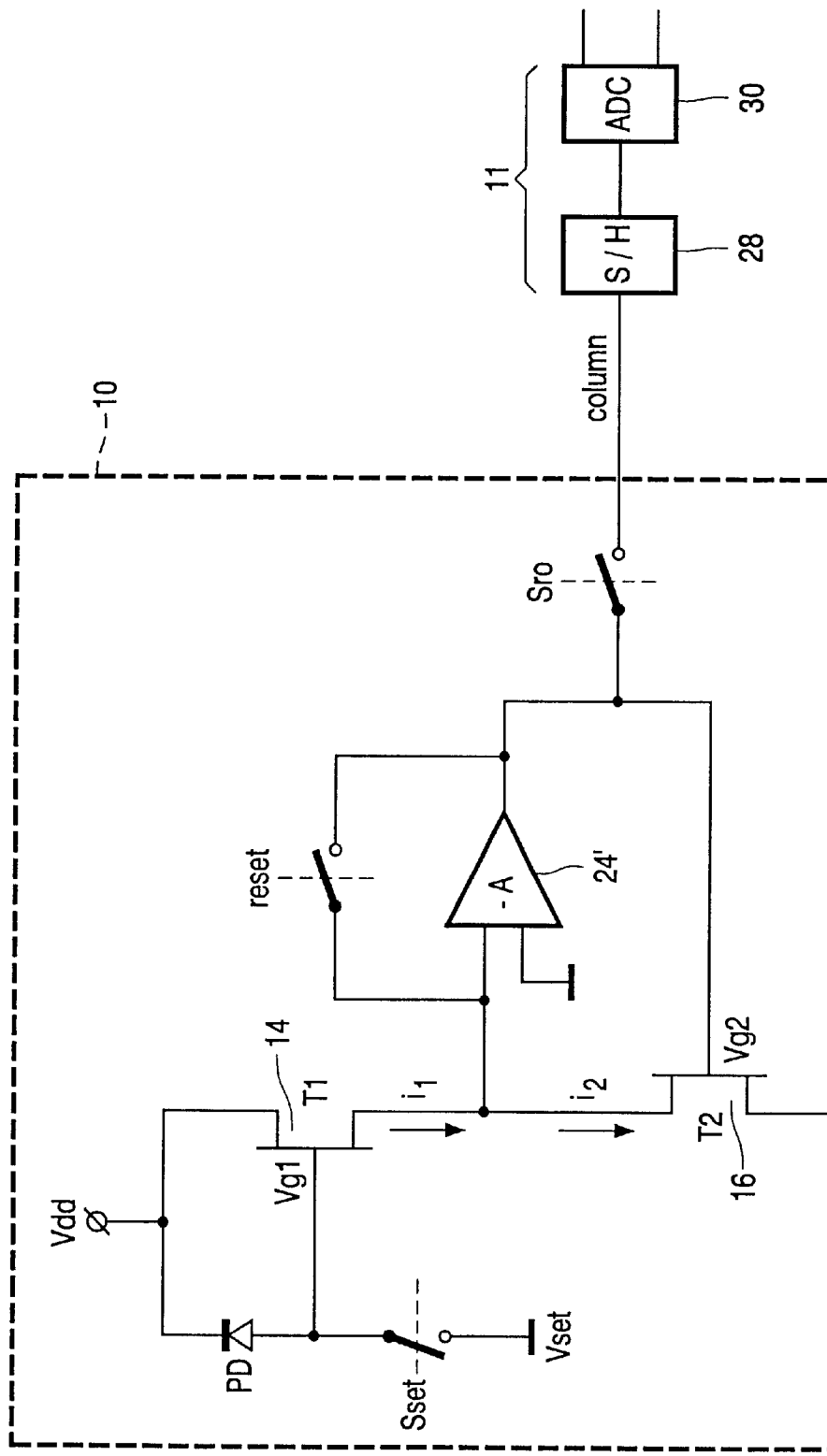
FIG. 4 shows a second example of pixel configuration according to the invention.

FIG. 4 shows a modification of the pixel configuration in which an individual amplifier 24' is included within each pixel. This changes the boundary defining the pixels 10, and enables a single shared control line to be required for each column of pixels. FIG. 4 otherwise corresponds to FIG. 1 and will not be described in further detail.

The image sensor substrate described may be used to form an X-ray image detector. For this purpose, a radiation conversion layer may be provided over the array of pixels for converting the incident X-ray signal into visible light for detection by the photodiode array.

Various modifications will be apparent to those skilled in the art. For example, the description above refers to the use of NMOS transistors, whereas it is of course equally possible than PMOS devices could be used with appropriate consideration of the voltage control levels.

What is claimed is:

1. An image sensor comprising a plurality of pixels, each pixel comprising:
    a light sensor element, a sensor voltage across the element varying depending on the light incident on the element; and
    first and second transistors, the first and second transistors being connected in series between voltage supply lines, a gate voltage on the first transistor being dependent upon the sensor voltage so that the current flowing through the first transistor is a function of the sensor voltage, and wherein the gate voltage of the second transistor is supplied by a feedback circuit which provides that the current through the first and second transistors is substantially equal, and wherein the output of the pixel is the gate voltage of the second transistor.

2. An image sensor as claimed in claim 1, wherein the first and second transistors have different current versus gate voltage characteristics so that the pixel provides gain.

3. An image sensor as claimed in claim 1, wherein the feedback circuit includes an open loop amplifier.

4. An image sensor as claimed in claim 3, wherein the input to the amplifier is the junction between the transistors, and the output from the amplifier is coupled to the gate of the second transistor.

5. An image sensor as claimed in claim 4, wherein first and second switches are provided between the junction and the amplifier input and between the gate of the second transistor and the amplifier output, respectively.

6. An image sensor as claimed in claim 3, comprising rows and columns of pixels, and wherein one amplifier is provided for each column of pixels.

7. An image sensor as claimed in claim 1, wherein the light sensor element comprises a photodiode.

8. An image sensor as claimed in claim 7, wherein the photodiode is coupled between one of the voltage supply lines and the gate of the first transistor.

9. An image sensor as claimed in claim 8, wherein the or each pixel is provided with a switch for providing a predetermined voltage to the gate of the first transistor, thereby charging the photodiode to a predetermined level.

10. A method of measuring light intensity of an image to be detected using a plurality of light sensor elements each forming a pixel of an image sensor, a sensor voltage across the elements varying depending on the light incident on the elements, the method comprising:

applying the sensor voltage to a gate of an associated first transistor thereby causing the current flowing through the first transistor to be a function of the light sensor voltage;

supplying a gate voltage to an associated second transistor using a feedback circuit which provides that the current through the first and second transistors is substantially equal; and measuring the gate voltage of the second transistor as output.

11. A method as claimed in claim 10, wherein an output is obtained for a dark field when the image sensor is shielded from the image to be detected, and an output is obtained for a light field when the image sensor is exposed to the image to be detected, and wherein the outputs are combined to obtain a light level signal.

* * * * *